United States Patent
Roubal et al.

(10) Patent No.: US 7,464,826 B2
(45) Date of Patent: *Dec. 16, 2008

(54) HOT-FILL CONTAINER BASE STRUCTURE

(75) Inventors: Ed Roubal, Stewartstown, PA (US); Roy N. Krohn, Wrightsville, PA (US); David Kesselman, York, PA (US); Larry Taylor, Landisville, PA (US)

(73) Assignee: Graham Packaging Company, L.P., York, PA (US)

( * ) Notice: Subject to any disclaimer, the term of this patent is extended or adjusted under 35 U.S.C. 154(b) by 27 days.

This patent is subject to a terminal disclaimer.

(21) Appl. No.: 11/284,970

(22) Filed: Nov. 23, 2005

(65) Prior Publication Data

US 2006/0070974 A1    Apr. 6, 2006

Related U.S. Application Data

(63) Continuation of application No. 10/370,571, filed on Feb. 24, 2003, now Pat. No. 7,000,793.

(51) Int. Cl.
*B65D 1/42* (2006.01)

(52) U.S. Cl. ...................... 215/373; 220/608

(58) Field of Classification Search ......... 215/370–373; 220/606–609
See application file for complete search history.

(56) References Cited

U.S. PATENT DOCUMENTS

| | | | |
|---|---|---|---|
| 2,988,258 A | 6/1961 | Witzke | |
| 3,140,796 A | 7/1964 | Broida | |
| 3,371,898 A | 3/1968 | Murray, Jr. | |
| 3,403,804 A * | 10/1968 | Colombo | 215/45 |
| 3,417,892 A * | 12/1968 | Schweiger | 215/371 |
| 3,468,443 A | 9/1969 | Paul | |
| 3,563,445 A | 2/1971 | Clayton | |
| 3,592,885 A * | 7/1971 | Goins et al. | 264/532 |
| 3,687,593 A * | 8/1972 | Gilbert | 425/531 |
| 3,757,978 A * | 9/1973 | Gilbert | 215/371 |
| 4,134,510 A | 1/1979 | Chang | |
| 4,759,454 A * | 7/1988 | Nowicki et al. | 215/12.1 |
| 4,989,738 A * | 2/1991 | Thayer et al. | 215/373 |
| 5,460,292 A | 10/1995 | Holman | |
| 5,503,283 A | 4/1996 | Semersky | |
| 5,685,452 A | 11/1997 | Kristoffersson | |
| 5,799,809 A * | 9/1998 | Sako et al. | 215/12.1 |
| 6,464,106 B1 * | 10/2002 | Giblin et al. | 222/109 |
| 6,619,501 B2 | 9/2003 | Hayes et al. | |
| 7,000,793 B2 * | 2/2006 | Roubal et al. | 215/373 |

FOREIGN PATENT DOCUMENTS

| | | |
|---|---|---|
| GB | 2164914 | 4/1986 |
| JP | 4-352688 | 12/1992 |

* cited by examiner

*Primary Examiner*—Sue A Weaver
(74) *Attorney, Agent, or Firm*—Knoble, Yoshida & Dunleavy, LLC

(57) ABSTRACT

The invention provides a base structure of a container. The base structure includes a support heel that defines any number of touch points for contact with a horizontal surface. The support heel includes inner and outer portions that merge with the container's corrugated support flute and sidewall, respectively. The base structure also includes a fin that forms the zipper pinch and extends transverse to and intersects corrugations of the corrugated support flute.

24 Claims, 6 Drawing Sheets

HOT-FILL CONTAINER BASE STRUCTURE

CROSS-REFERENCE TO RELATED APPLICATIONS

The present invention is a continuation of U.S. patent application Ser. No. 10/370,571, filed Feb. 24, 2003, now U.S. Pat. No. 7,000,793 the entire content of which is incorporated herein by reference.

BACKGROUND OF THE INVENTION

1. Field of the Invention

The present invention relates generally to a container having a base structure for enhancing the structural integrity of the container.

2. Related Art

The warehouse club industry and consumer bulk purchasing have led to a boom in larger size packaging. Many liquid products are now sold to the consuming public in plastic containers that can be as large as 128 fluid ounces (one gallon). Larger containers that hold heavy fluids, including beverages, home products, motor oil, or the like, require a base structure that can withstand the forces applied against it, such as the weight of the fluid itself. Additionally, the containers must withstand rough handling during transportation and other forces applied to them as a result of being stacked during storage or from being dropped. Finally, large beverage containers that are filled by the so-called hot-fill process must be structurally sound to withstand various forces relating to the hot-fill process.

The hot-fill process is the procedure by which containers are filled with a beverage at a high temperature and capped soon thereafter. As the beverage cools within the container, stresses and strains develop in the container due to changes in the volume of the contents. In the case of large containers, the hot-fill process can cause, among other things, sagging in the base and rolls in the corners of the container.

A container that is commonly used in the hot-fill process is the polyolefin continuous extrusion blow-molded container. Polyolefin continuous extrusion blow-molded container's are multi-layer containers that provide the requisite structure and barriers to oxygen and oils, for example. These multi-layered containers typically include an exterior layer of polyolefin, such as, polypropylene or polyethylene as the main structure providing layer. Other layers can include oxygen barrier layers, moisture barrier layers, and regrind layers to provide the necessary barrier structures, as well as, adhesion between the layers.

It is understood by a person having ordinary skill in the art that to form a polypolefin continuous extrusion blow-molded plastic container, a parison can be heated in an extruder, captured by a mold, and blown in the mold. Specifically, to form the cavity of the container, a parison can be extruded up into the mold and as the mold comes together, a pneumatic blow pin, for example, can pierce the parison and blow the parison up against the walls of the mold. The mold typically contains flash pockets above and below the cavity in the mold to capture the excess parison above and below the cavity. It can be understood by a person having ordinary skill in the art, that as the parison is blown inside the mold and captured in the flash pockets, portions of the parison must adhere together. Once the container is cooled, the excess flash can then be cut away from the container after being ejected from the mold.

The desire to provide structural integrity to large containers has resulted in the development of different techniques to design containers that have structurally sound bases. The introduction of different structural elements into the base of the container is known to improve the containers structural integrity. While these structural elements molded in the base's structure can afford structural integrity, they must also be able to withstand the forces of the hot-fill process.

Although the aforementioned structural elements may function satisfactorily for their intended purposes, there is a need for a large container having a base structure that can withstand the forces of the hot-fill process. The base structures should be capable of accommodating variations in volume of the containers' contents and changes of pressure and temperature. Furthermore, the base structure should be capable of being manufactured in conventional high-speed equipment.

SUMMARY OF THE INVENTION

A base structure for a hot-fill container is disclosed.

Particular embodiments of the invention provide a base structure of a container. In one embodiment, the base structure includes a support heel that defines any number of touch points for contact with a horizontal surface. The support heel includes inner and outer portions that merge with the container's corrugated support flute and sidewall, respectively. The base structure also includes a fin that extends transverse to and intersects corrugations of the corrugated support flute.

In a further embodiment, the base structure includes a support heel that defines any number of touch points for contact with a horizontal surface. The support heel includes inner and outer portions that merge with the container's plurality of ribs and sidewall, respectively. Each rib has two ends that merge with the support heel. The base structure also includes a fin that extends transverse to and intersects at least one rib.

Yet another embodiment of the invention provides a container that has a neck portion, base structure, and sidewall. The neck portion defines an opening and the sidewall merges with the base structure and the neck portion at opposite ends of the container. The base structure includes a support heel that defines any number of touch points for contact with a horizontal surface. The support heel includes inner and outer portions that merge with the container's corrugated support flute and sidewall, respectively. The base structure also includes a fin that extends transverse to and intersects corrugations of the corrugated support flute.

Further features and advantages of the invention, as well as the structure and operation of various embodiments of the invention, are described in detail below with reference to the accompanying drawings.

BRIEF DESCRIPTION OF THE DRAWINGS

The foregoing and other features and advantages of the invention will be apparent from the following, more particular description of preferred embodiments of the invention, as illustrated in the accompanying drawings wherein like reference numbers generally indicate identical, functionally similar, and/or structurally similar elements.

DETAILED DESCRIPTION OF THE INVENTION

Preferred embodiments of the invention are discussed in detail below. While specific exemplary embodiments are discussed, it should be understood that this is done for illustration purposes only. A person skilled in the relevant art will recognize that other components and configurations can be used without parting from the spirit and scope of the invention.

There are several currently existing structures that can provide support for the base of a hot-fillable container. For example, a corrugated support flute, most commonly used in laundry detergent containers that are not hot-filled, includes any number of corrugations to provide resistance against sagging caused by the weight of the liquid itself. The corrugated support flutes also provides structure to assist the base in maintaining its designed shape and resisting warpage while the plastic is cooling prior to the filling process.

Similarly, a fin can be constructed into the pinch area of the base to give additional stability to the area in the base where pieces of parison fuse together. For example, in beverage bottles or the like that contain a gas barrier, a fin can provide a larger area near the base of the bottle for the pieces of parison to amalgamate and adhere to each other. Like the corrugated support flute, the fin also provides structure to assist the base in maintaining its designed shape and resisting warpage while the plastic is cooling prior to the filling process.

In the context of large, hot-fillable containers, these structures, when used independently, tend to be less effective. For example, a one gallon container having corrugations alone is less desirable because it would require a push-up so deep that the undercuts in the mold may not be pulled through when the container is released from the mold. Additionally, given the weight of the liquid to be placed in the container, a corrugated support flute alone may not provide for adequate adhesion and cause the plastic in the base to pull apart.

Like the corrugated support flute, a fin alone is less desirable because although it may provide for adequate adhesion, it will not likely provide enough support to prevent sagging. Thus, it is desirable to provide a base structure for a large container, preferably for use in the hot-fillable process, with adequate structure to prevent sagging and provide for adhesion of the parison in the base of the container.

Figure 1:
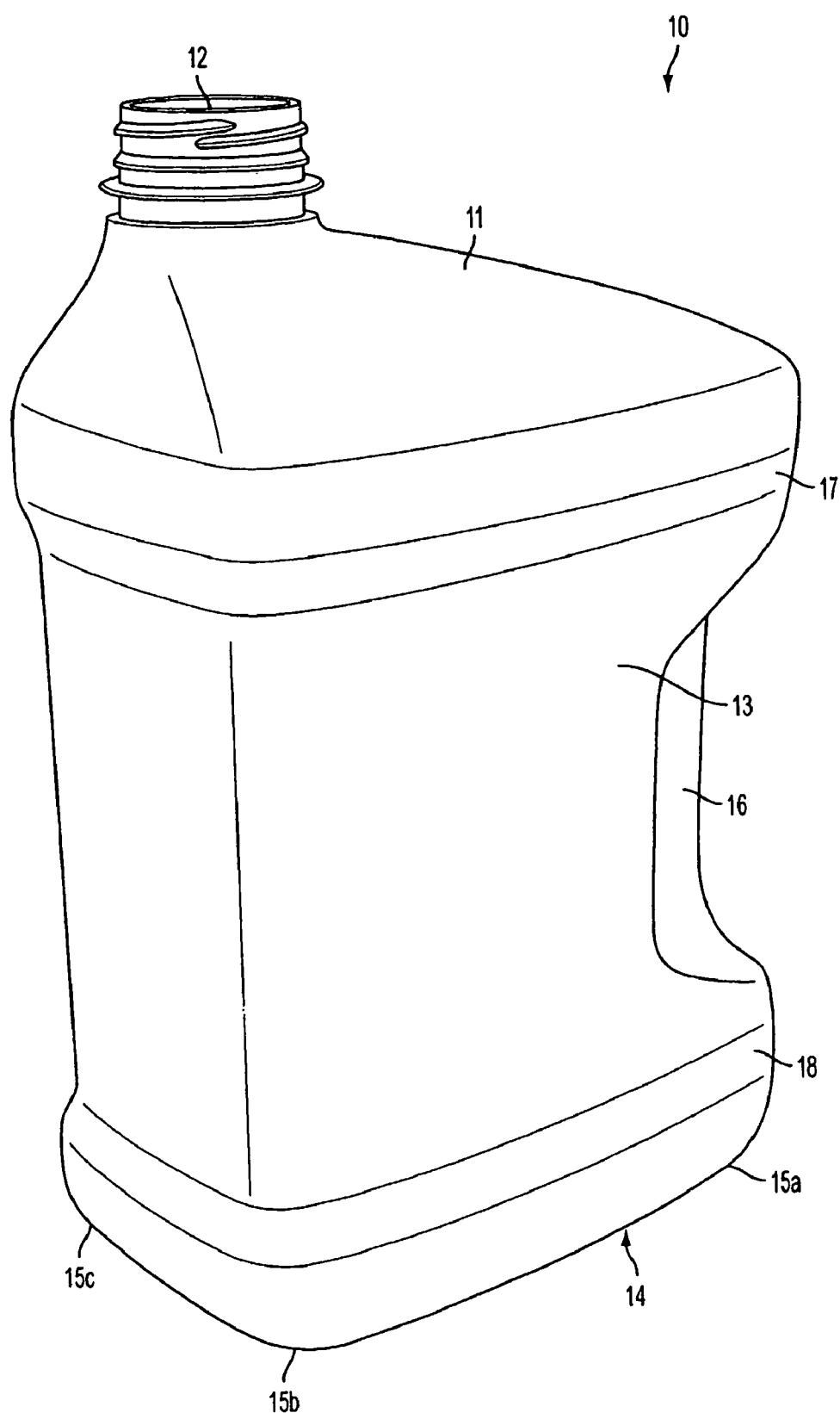
FIG. 1 depicts a perspective view of an exemplary embodiment of a hot-fill container according to the present invention.

Referring now to the drawings, FIG. 1 illustrates an exemplary embodiment of a blow-molded plastic container 10, such as may be used in the sale of juices and non-carbonated beverages. Such containers can typically be designed to contain liquid volumes of one gallon, 64 ounces, or the like. Container 10 can have a neck portion 11 defining an opening 12 allowing for pouring and filling of a beverage. Neck portion 11 merges with sidewall 13. Depending upon the cross-sectional shape of container 10, sidewall 13 can have any number of sides. For example, as shown in FIG. 1, container 10 has 4 sides defined by the container's rectangular cross-sectional shape. Sidewall 13 can also include upper label bumper 17 and lower label bumper 18. These label bumpers can be positioned on container 10 near where sidewall 13 merges with neck portion 11 and base structure 14, respectively. Sidewall 13 merges with base structure 14 opposite neck portion 11.

Container 10 is designed to receive a cap (not shown) during the hot-fill process to seal the container and confine the beverage inside the container. While sidewall 13 is shown as a rectangular cross-sectional sidewall, any shape can be utilized, such as a square or triangular cross-sectional sidewall, or a cylinder. It is understood by people having ordinary skill in the art that the edges of the container can be rounded and although the container may be rectangular, the edges may not form perfect right angles. In such an embodiment, base structure 14 would be shaped appropriately to merge with sidewall 13.

Figure 5:
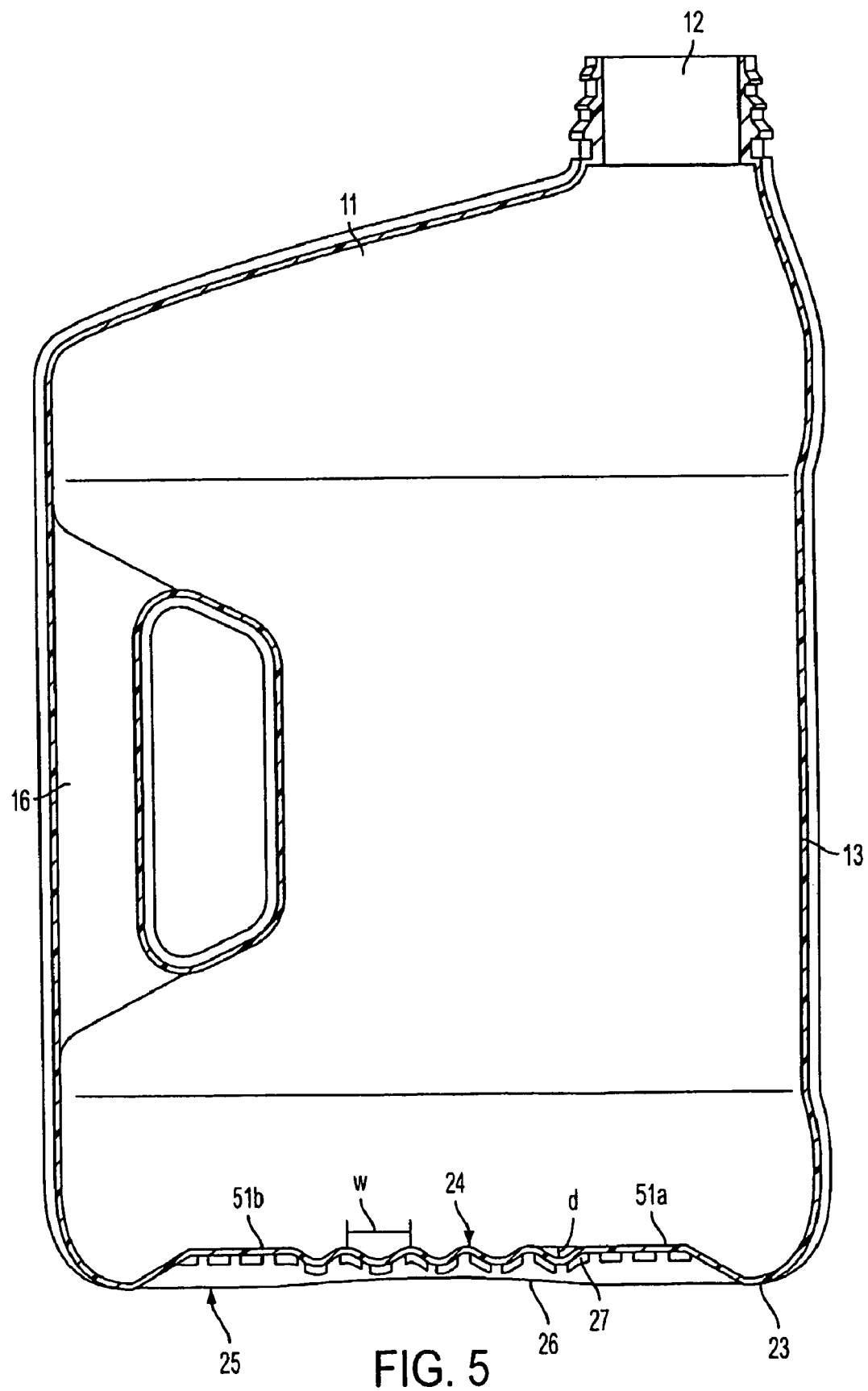
FIG. 5 depicts a cross-sectional view along section line 5-5 in FIG. 2.

Container 10 can also include a handle 16 for receiving the grip of a consumer's hand. As shown in FIG. 5, handle 16 can be hollow and thus able to store fluid when container 10 is filled.

Base structure 14 can be arcuate or dome-like such that the base of the container can define touch points at which the base of the container makes contact with a horizontal surface (not shown). For example, base structure 14 of container 10 can be arched towards the center of the container so as to define four touch points 15a-d as shown in FIGS. 1-4. As sagging occurs, whether it be from the weight of the liquid itself or as a result of the hot-fill process, the arching can ensure that no portion of base structure 14 sags below touch points 15a-d. This arching up into the center of container 10 can be called rocker correction.

Figure 2:
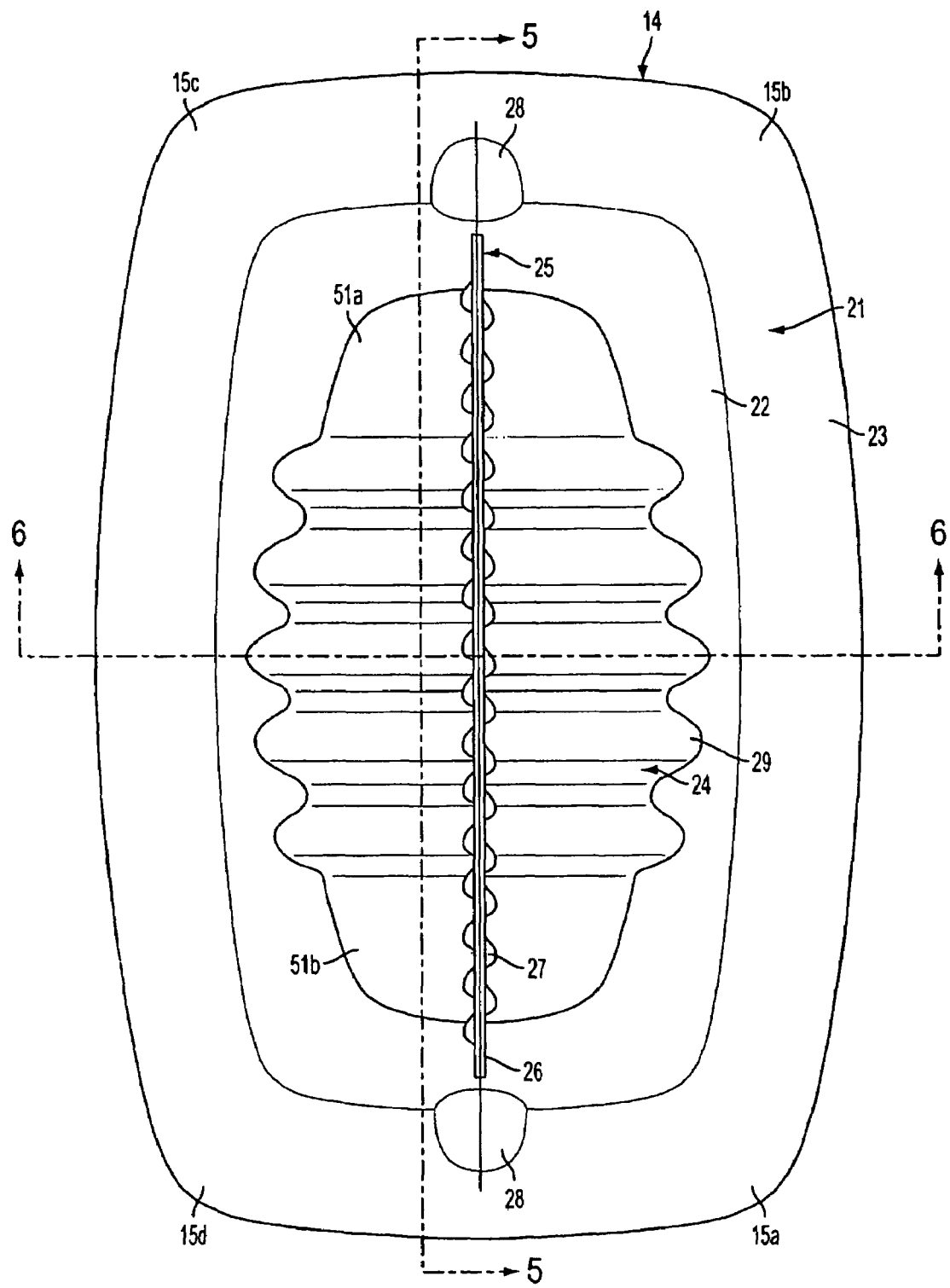
FIG. 2 depicts a base structure of an exemplary embodiment of a hot-fill container according to the present invention.

In addition to rocker correction, base structure 14 also can include structure that can, among other things, prevent sagging. As seen in FIG. 2, base structure 14 has an annular support heel 21. Support heel 21 allows container 10 to be supported erect on a horizontal surface. Like sidewall 13, support heel 21 can have any number of sides, depending on the cross-sectional shape of the container. For example, support heel 21 can have 4 sides that are defined by the container's rectangle cross-sectional shape. Two of these sides can extend substantially parallel to each other in a longitudinal direction, while the other two sides can extend substantially parallel to each other in a direction that is transverse to the longitudinal direction. As described above, each side of support heel 21 can be arched toward the center of container 10 to define touch points 15 a-d. The apex of the arc that extends in the longitudinal direction can be, for example, 0.080 inches from touch points 15a-d. Similarly, the apex of the arc extending in the transverse direction can be, for example, 0.120 inches from touch points 15a-d.

Figure 3:
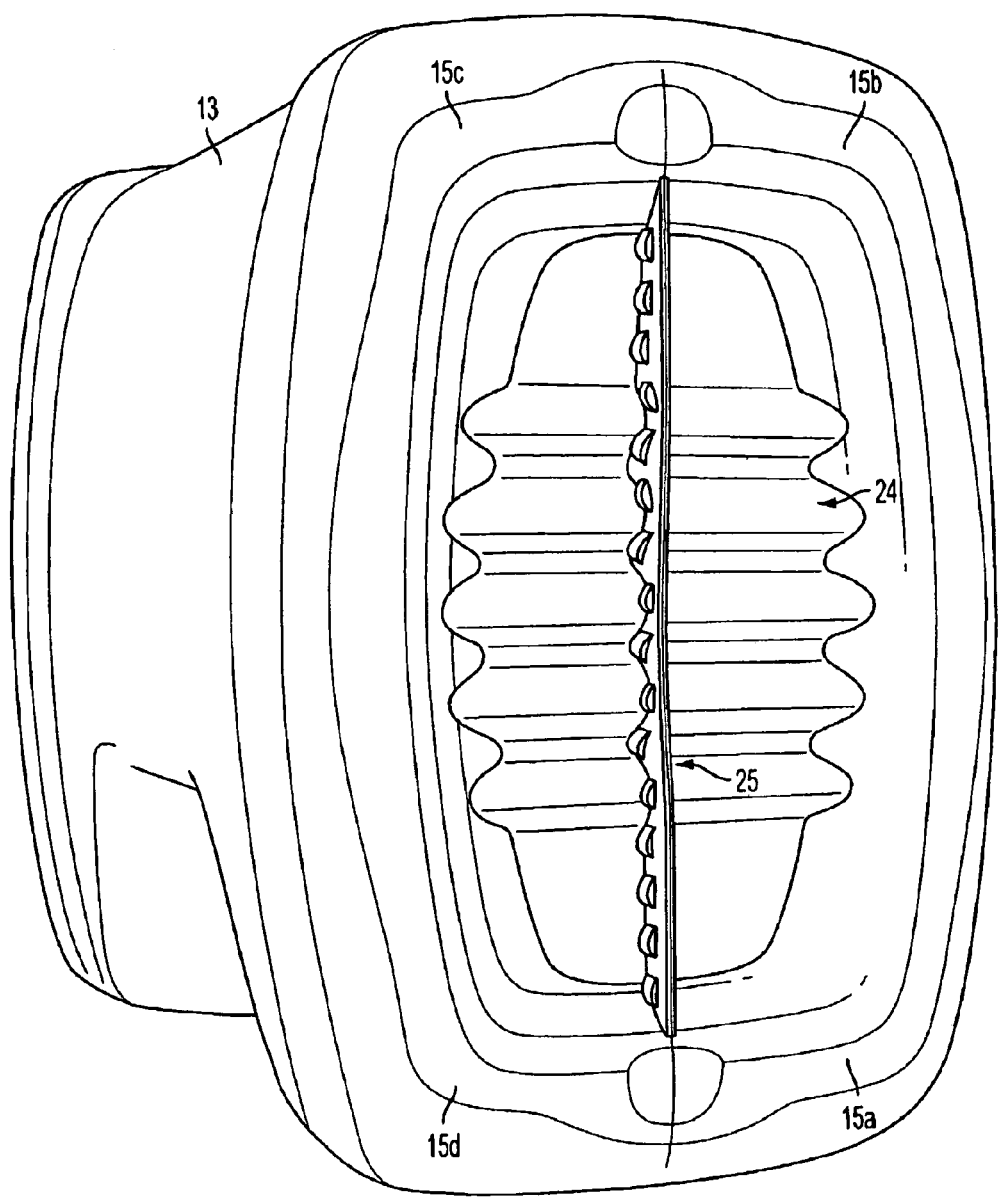
FIG. 3 depicts a perspective view of a base structure of an exemplary embodiment of a hot-fill structure according to the present invention.
Figure 4:
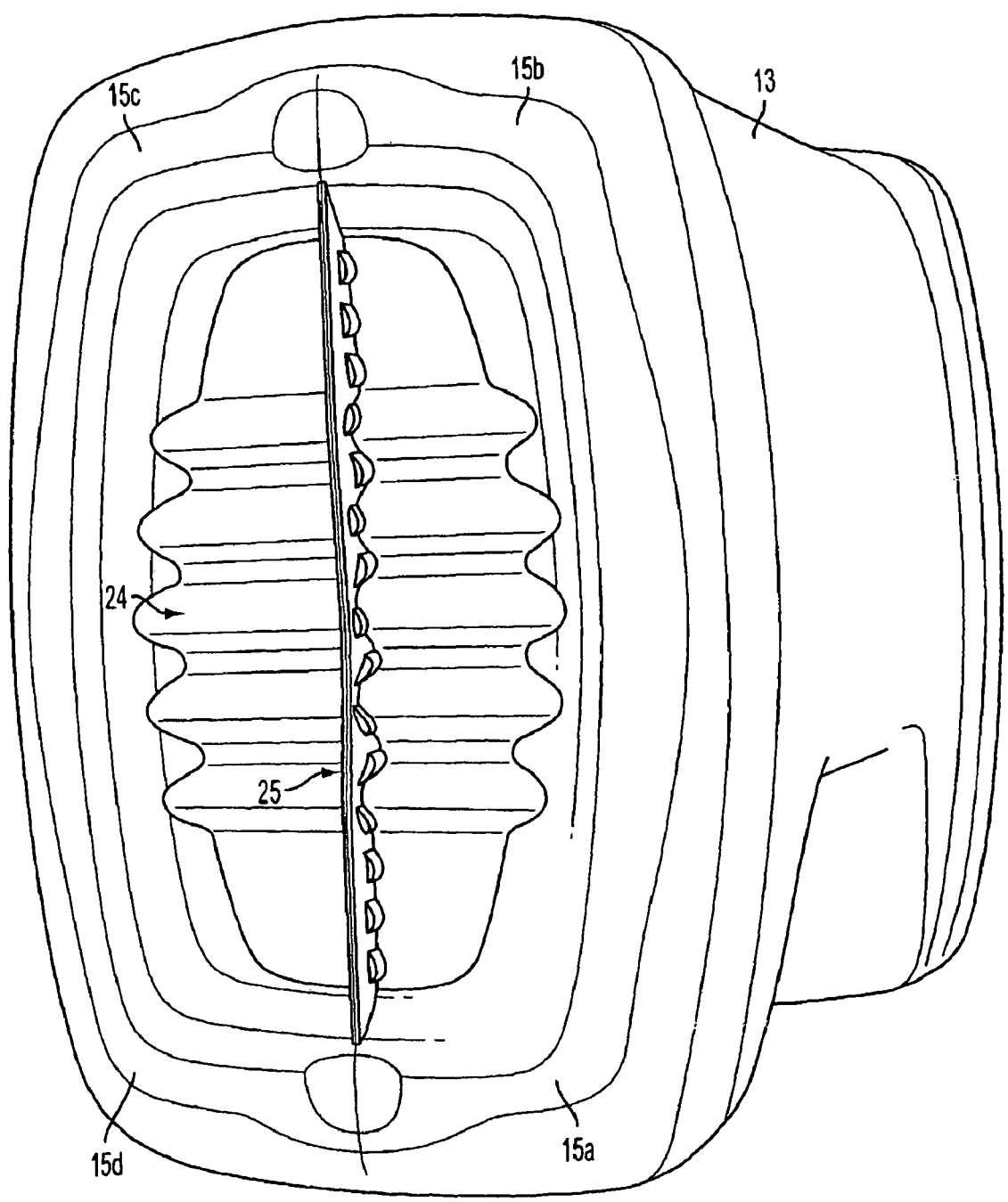
FIG. 4 depicts a perspective view of a base structure of an exemplary embodiment of a hot-fill structure according to the present invention.

Annular support heel 21 can have an inner and an outer portion, 22 and 23, respectively. Outer portion 23 merges with the container's sidewall 13. The inner portion of the annular support heel, which merges with a corrugated support flute 24, can have an upwardly inclined surface that angles upward from support heel 21 to corrugated support flute 24, as shown in FIGS. 3 and 4. The upwardly inclined surface of inner portion 22 can be as inclined as possible so long as the undercuts in the mold can be pulled through once the container is blown. Otherwise, if the upwardly inclined surface of inner portion 22 is at too great of an inclination, the undercuts in the mold may cock the container in a sideways direction and not allow the container to be released from the mold properly.

Corrugated support flute 24 can have any number of corrugations (ribs) 29 extending across any portion of corrugated support flute 24. For example, as shown in FIG. 2, corrugated support flute 24 can have 5 corrugations 29. As shown in FIG. 5, each corrugation 29 can have a width "w" that extends between the centers of adjacent corrugations 29 and a depth "d" that extends from the top of the inside of base structure 14 down into each corrugation 29. In a preferred embodiment, corrugated support flute 24 can also have flat surfaces 51a-b that can connect the outer-most corrugations 29 to inner portion 22 of annular support heel 21. Surfaces 51a-b can receive engraved symbols such as, for example, the SPI recycling code, the manufacturer's logo, the cavity number, or the set designation.

Positioned transverse to the corrugated support flute 24 is a fin 25. It can be understood by a person having ordinary skill in the art that fin 25 will be located in the pinch area of base structure 14 of container 10. Fin 25 can extend in a longitudinal direction, for example, and intersect any portion of any of corrugations 29 of corrugated support flute 24. In a preferred embodiment, fin 25 can intersect all corrugations 29 of corrugated support flute 24 through the center of each corrugation 29, as shown in FIGS. 2-5.

Figure 6:
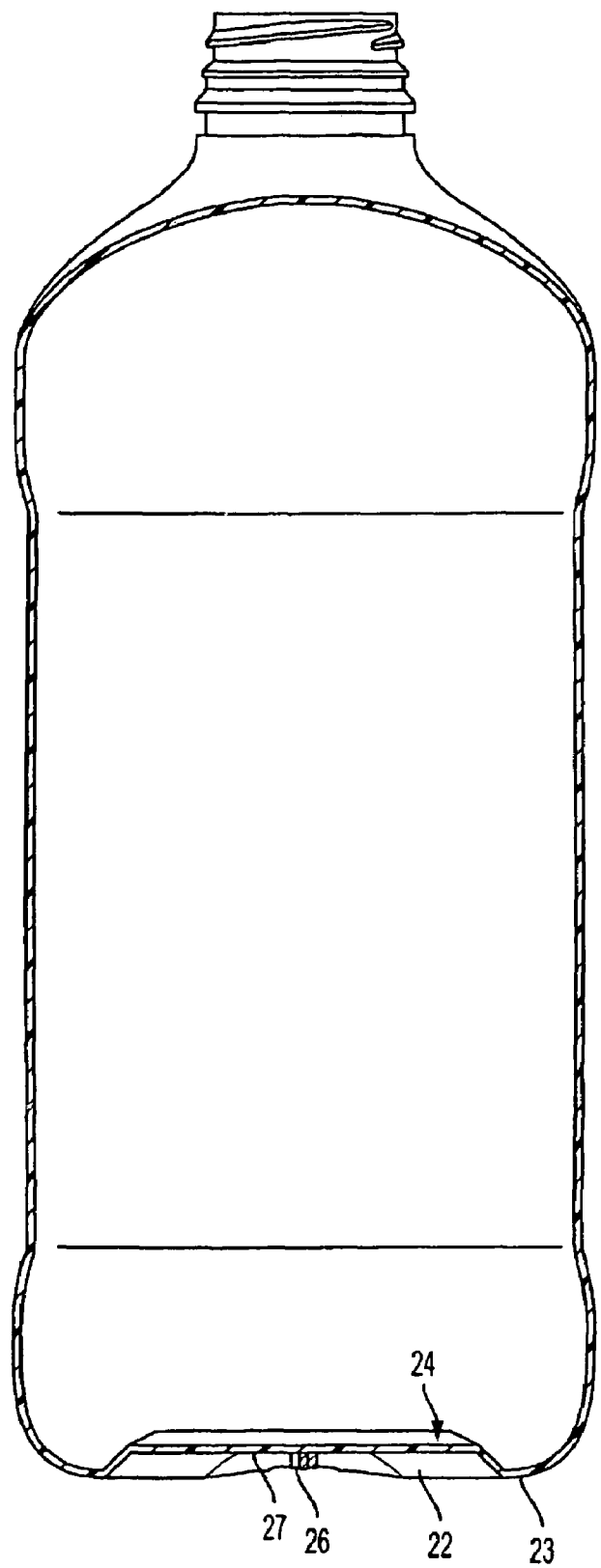
FIG. 6 depicts a cross-sectional view along section line 6-6 in FIG. 2.

Fin 25 can have a beam 26 extending transverse to corrugated support flute 24 and a plurality of protrusions 27 that are alternatively positioned on either side of beam 26 to form a so-called zippered pinch. Beam 26 can extend in a longitudinal direction, for example, and merge with inner portion 22 of annular support heel 21. In a preferred embodiment, the alternatively positioned protrusions 27 may overlap. As shown in FIGS. 5 and 6, beam 26 may extend below protrusions 27. Additionally, in a preferred embodiment, the top side of fin 25 can follow the contour of corrugations 29 of corrugated support flute 24. In a similar fashion, protrusions 27 may also follow the contour of corrugations 29 of corrugated support flute 24.

In a preferred embodiment of the invention, base structure 14 can have tunnels 28. As described above, the mold typically contains flash pockets above and below the cavity in the mold to capture the excess of the parison that is captured in the flash pockets above and below the cavity. Tunnels 28 can provide a channel for the excess parison to travel through as the excess parison is forced into the flash pockets.

It is the combination of corrugated support flute 24 and the positioning of fin 25 transverse to the corrugated support flute that allows the base structure of the present invention to provide the desired structural integrity of the container bottom. The support flute and the zipper pinch will act in a manner to withstand the changes in temperature, pressure, and volume within the container during the hot-fill process, as well as other forces applied to it during the construction, transportation, and storage of the container. The support flute and the zipper pinch cooperate to resist sagging of the base by providing the necessary structure to withstand all forces applied to the container. Additionally, the vertical beam and zipper pinch of the fin resists deformation of the base structure.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A base structure for a container having a sidewall, the base structure comprising:
   a support heel defining a touch point for contact with a horizontal surface, the support heel having an outer portion and an inner portion, the outer portion merging with the container sidewall;
   a corrugated support flute having corrugations surrounded by the support heel and merging with the inner portion of the support heel;
   a solid fin extending transverse to and intersecting at least one of the corrugations of the corrugated support flute;
   wherein the corrugations extend in a first direction and a center of each corrugation defines a midpoint of the base structure in the first direction, and the fin extends in a second direction substantially perpendicular to the first direction and substantially through the center of each corrugation;
   wherein the fin further comprises:
   a beam having first and second sides, the second side being opposite and substantially parallel to the first side; and
   a plurality of protrusions alternatively positioned on the first and second sides of the beam; and
   wherein at least one pair of adjacent alternatively positioned protrusions overlap.

2. The base structure according to claim 1, wherein the fin further comprises:
   a zigzag curve extending in a longitudinal direction; and
   a beam extending in the longitudinal direction and intersecting the zigzag curve.

3. The base structure according to claim 1, wherein the inner portion of the support heel is an upwardly inclined surface.

4. The base structure according to claim 1, wherein the support heel provides a circumferential line of support.

5. The base structure according to claim 1, wherein the support heel provides an annular line of support.

6. The base structure according to claim 1, further comprising:
   a flat surface that merges with the corrugations and the inner portion of the support heel.

7. The base structure according to claim 1, wherein the support heel defines four touch points.

8. A base structure according to claim 7, wherein the fin further comprises:
   a zigzag curve extending in a longitudinal direction; and
   a beam extending in the longitudinal direction and intersecting the zigzag curve.

9. The base structure according to claim 7, wherein the corrugations extend in a latitudinal direction and a center of each corrugation defines a midpoint of the base structure in the latitudinal direction, and the fin extends in a longitudinal direction substantially perpendicular to the latitudinal direction and substantially through the center of each corrugation.

10. The base structure according to claim 7, wherein the inner portion of the support heel is an upwardly inclined surface.

11. A base structure according to claim 7, wherein the support heel is substantially rectangular.

12. The base structure according to claim 7, further comprising:
   a flat surface that merges with the corrugations and the inner portion of the support heel.

13. The base structure according to claim 1, wherein the corrugated support flute remains vertically higher than the support heel.

14. The base structure according to claim 1, wherein the fin remains vertically higher than the support heel.

15. A base structure for a container having a sidewall, the base structure comprising:
   a support heel defining a touch point for contact with a horizontal surface, the support heel merging with the container sidewall;

a plurality of ribs, each rib having two ends that merge with the support heel;

a solid fin extending transverse to and intersecting at least one of the ribs, wherein the ribs extend in a first direction and a center of each rib defines a midpoint of the base structure in the first direction, and the fin extends in a second direction substantially perpendicular to the first direction and substantially through the center of each rib;

wherein the fin comprises a zigzag curve extending in a longitudinal direction; and a beam extending in the longitudinal direction and intersecting the zigzag curve.

16. The base structure according to claim 15, wherein the fin further comprises:

the beam having first and second sides, the second side being opposite and substantially parallel to the first side; and a plurality of protrusions alternatively positioned on the first and second sides of the beam.

17. The base structure according to claim 16, wherein at least one pair of adjacent alternatively positioned protrusions overlap.

18. The base structure according to claim 15, wherein the support heel defines four touch points.

19. The base structure according to claim 15, further comprising:

a flat surface that merges with the corrugations and the inner portion of the support heel.

20. The base structure according to claim 15, wherein the corrugated support flute remains vertically higher than the support heel.

21. The base structure according to claim 15, wherein the fin remains vertically higher than the support heel.

22. A container comprising:

a neck portion defining an opening;

a base structure; and a sidewall that merges with the base structure and the neck portion at opposite ends of the container, wherein the base structure has:

a support heel defining a touch point for contact with a horizontal surface, the support heel having an outer portion and an inner portion, the outer portion merging with the container sidewall;

a corrugated support flute having corrugations surrounded by the support heel and merging with the inner portion of the support heel; and a solid fin extending transverse to and intersecting at least one of the corrugations of the support flute;

wherein the fin comprises a beam having first and second sides, the second side being opposite and substantially parallel to the first side; and a plurality of protrusions alternatively positioned on the first and second sides of the beam, wherein at least one set of adjacent protrusions overlap.

23. The base structure according to claim 22, wherein the corrugated support flute remains vertically higher than the support heel.

24. The base structure according to claim 23, wherein the fin remains vertically higher than the support heel.

* * * * *